(12) United States Patent
Borrell Bayona et al.

(10) Patent No.: US 11,223,746 B2
(45) Date of Patent: Jan. 11, 2022

(54) SELECT PRINT MODE CONFIGURATIONS

(71) Applicant: HEWLETT-PACKARD DEVELOPMENT COMPANY, L.P., Spring, TX (US)

(72) Inventors: M. Isabel Borrell Bayona, Sant Cugat del Valles (ES); Alex Campa Coloma, Sant Cugat del Valles (ES); Jordi Bas Ferrer, Sant Cugat del Valles (ES); Adria Gallart del Burgo, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/957,690

(22) PCT Filed: Feb. 13, 2018

(86) PCT No.: PCT/US2018/017909
§ 371 (c)(1),
(2) Date: Jun. 24, 2020

(87) PCT Pub. No.: WO2019/160530
PCT Pub. Date: Aug. 22, 2019

(65) Prior Publication Data
US 2020/0366811 A1 Nov. 19, 2020

(51) Int. Cl.
*H04N 1/60* (2006.01)
*B41J 2/21* (2006.01)

(52) U.S. Cl.
CPC .......... *H04N 1/6027* (2013.01); *B41J 2/2132* (2013.01); *H04N 1/6047* (2013.01)

(58) Field of Classification Search
CPC .. H04N 1/6027; H04N 1/6047; H04N 1/6033; B41J 2/2132
See application file for complete search history.

(56) References Cited

U.S. PATENT DOCUMENTS

| | | | |
|---|---|---|---|
| 6,229,972 B1 | 5/2001 | Rushing | |
| 6,547,362 B2 | 4/2003 | Subirada et al. | |
| 6,994,413 B2 | 2/2006 | Otsuka et al. | |
| 7,367,156 B2* | 5/2008 | Kondo | B41J 2/2121 347/14 |
| 7,695,090 B2 | 4/2010 | Kawamura | |
| 7,819,497 B2 | 10/2010 | Konno et al. | |
| 2002/0171697 A1* | 11/2002 | Gargir | B41J 2/0458 347/14 |
| 2008/0143776 A1* | 6/2008 | Konno | H04N 1/6013 347/19 |

(Continued)

*Primary Examiner* — Ted W Barnes
(74) *Attorney, Agent, or Firm* — HP Inc. Patent Department

(57) ABSTRACT

An example of a system for selecting print mode configurations is disclosed. The example disclosed herein comprises an array of nozzles to eject ink, and a controller. The controller is to instruct the array of nozzles to print a plurality of color patches, each color patch being printed using different nozzle setting values. Also, the controller is to receive a sensor signal from each color patch from a color sensor. The controller is further to derive color saturation and/or density measurement information from the sensor signals; and to select a print mode configuration based on the color saturation and/or density measurement information.

19 Claims, 8 Drawing Sheets

(56) References Cited

U.S. PATENT DOCUMENTS

| | | | |
|---|---|---|---|
| 2008/0252677 A1 | 10/2008 | Tajika et al. | |
| 2009/0161130 A1* | 6/2009 | Mabuchi | B41J 29/02 |
| | | | 358/1.9 |
| 2010/0085854 A1 | 4/2010 | Nakahara | |
| 2010/0207972 A1* | 8/2010 | Kawai | B41J 29/393 |
| | | | 347/6 |
| 2011/0032296 A1* | 2/2011 | Nakano | B41J 2/2135 |
| | | | 347/14 |
| 2011/0037806 A1* | 2/2011 | Nakano | B41J 19/145 |
| | | | 347/37 |
| 2012/0081768 A1* | 4/2012 | Iguchi | H04N 1/6033 |
| | | | 358/518 |
| 2012/0287197 A1 | 11/2012 | Yasutani | |
| 2013/0222461 A1* | 8/2013 | Kaszynski | H04N 1/4078 |
| | | | 347/19 |
| 2016/0052318 A1* | 2/2016 | Humet Pous | B41J 2/01 |
| | | | 347/19 |
| 2016/0347051 A1* | 12/2016 | Narumi | B41J 2/2142 |
| 2017/0072680 A1* | 3/2017 | Yokota | B41J 19/145 |
| 2020/0366811 A1* | 11/2020 | Borrell Bayona | H04N 1/6027 |

* cited by examiner

SELECT PRINT MODE CONFIGURATIONS

BACKGROUND

An inkjet printer is a system that creates a printed image by propelling printing fluid through nozzles to substrate pixels. The printing fluid drops may have printing fluid pigments and are typically stored in a printing fluid repository. The accuracy in which the printing fluid drops are placed in the substrate pixels may lead to a better print job quality or image quality (IQ).

BRIEF DESCRIPTION OF THE DRAWINGS

The present application may be more fully appreciated in connection with the following detailed description taken in conjunction with the accompanying drawings, in which like reference characters refer to like parts throughout and in which.

DETAILED DESCRIPTION

Figure 1:
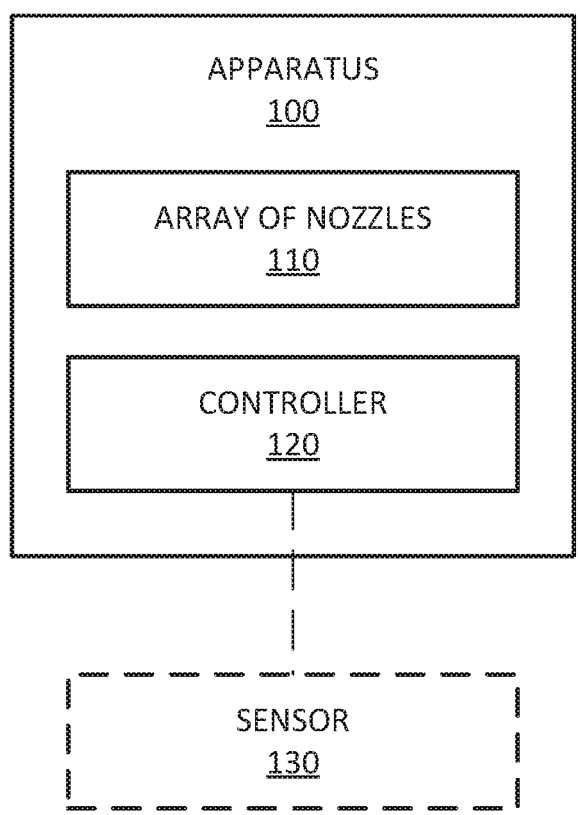
FIG. 1 is a block diagram illustrating an example of an apparatus to select print mode configurations.

The following description is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to indicate that the scope of the disclosure, including the claims, is limited to that example. In the following description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

An inkjet printer is a system that creates a printed image by propelling printing fluid through nozzles to substrate pixels. Any printing fluid may be used in the following examples, however the any "printing fluid" is referred as "ink" hereinafter. The ink drops may have ink pigments and are typically stored in an ink repository. The accuracy in which the ink drops are placed in the substrate pixels may lead to a better print job quality or image quality (IQ).

There may be variability in the manufacturing of arrays of nozzles. One manufacturing process example may be the assembly of a die onto a pen body. The die experiments tensions that may cause a slight deformation of the die, which may cause drop trajectory errors. Therefore, due to manufacturing variability, the drops of ink from different arrays of nozzles may fire ink in different ways. A given nozzle may fire ink deviated slightly inwards or outwards compared to another nozzle. The previous effect may lead to ink drops from different nozzle arrays reaching the substrate in different shapes with different ink coverage and print quality therein.

One example of the present disclosure provides a printing apparatus that comprises an array of nozzles to eject ink, and a controller. The controller is to instruct the array of nozzles to print a plurality of color patches, each color patch being printed using different nozzle setting values. Also, the controller is to receive a sensor signal from each color patch from a color sensor; and derive color saturation and/or density measurement information from the sensor signals. The controller is further to select a print mode configuration based on the color saturation and/or density measurement information.

Another example of the present disclosure provides a method comprising a plurality of blocks to be performed. The method comprises the block of instructing an array of nozzles to print a plurality of color patches, each color patch being printed using different nozzle setting values. The method also comprises the block of receiving a sensor signal from each color patch from a color sensor; and the block of deriving color saturation and/or density measurement information from the sensor signals. The method further comprises the block of selecting a print mode configuration based on the color saturation and/or density measurement information.

Another example of the present disclosure provides a non-transitory machine readable medium storing instructions executable by a processor. The non-transitory machine readable medium comprises instructions to print a plurality of color patches, each color patch being printed using different nozzle setting values. The non-transitory machine readable medium also comprises instructions to receive a sensor signal from each color patch from color sensor; and instructions to derive color saturation and/or density measurement information from the received signals. The non-transitory machine readable medium further comprises instructions to select a print mode configuration based on the color saturation and/or density measurement information.

Referring now to the figures, FIG. 1 is a block diagram of an example apparatus 100 for selecting a print mode configuration according to an implementation. In some implementations, the apparatus 100 may be included in a print head of a printer. The apparatus 100 includes an array of nozzles 110, and a controller 120. The term nozzle may be understood as a spout at the end of a pipe, hose, or tube used to control a jet of ink. The array of nozzles may comprise one nozzle, or a plurality of nozzles. A plurality of examples of arrays of nozzles are shown in FIGS. 2A-2D. The term "controller" as used herein may include a series of instructions encoded on a machine-readable storage medium and executable by a single processor or a plurality of processors. Additionally or alternatively, a controller may include one or more hardware devices including electronic circuitry, for example a digital and/or analog application-specific integrated circuit (ASIC), for implementing the functionality described herein.

In some implementations, the array of nozzles 110 may be mounted in the printing plate of a print head. The array of nozzles 110 may be coupled to an external ink repository to provide ink; whereas in different implementations, the ink repository may be included in the array of nozzles 110. The array of nozzles 110 may be provided with bidirectional communication to the controller 120. The controller 120 may instruct the array of nozzles 110 to print a plurality of color patches. Each color patch being printed using different nozzle setting values. A color patch is a printed area in which the printing operation has been carried out by using specific nozzle setting values, One example of a plurality of color patches is disclosed in further detail in FIG. 3.

In an implementation, the nozzle array is a static array spanning the full width of the print job. In another implementation, the nozzle array partially covers the width of the print job. The array of nozzles may be provided as to move throughout the width of the print job ejecting ink in its appropriate place. In said implementation, the movement of the array of nozzles defines a first direction and a second direction, wherein the first direction is opposite to the second direction. In an example, the first direction may comprise the movement of the array of nozzles from a starting point of a section of the printing job to the furthest point of that section of the printing job, said furthest point referred hereinafter as the opposite point. In the same example, the second direction may comprise the movement of the array of nozzles from the opposite point to the starting point of a given section of the printing job. One example of first and second direction has been disclosed, however other possible implementations may apply.

The nozzle setting values are the values of any of the parameters that may generate influence on the result of an inkjet operation of a given nozzle. The nozzle setting values may be those parameter values to be checked to meet the printing expectations and/or calibrate the apparatus 100. An example of nozzle setting value is the color and quantity of the ink. Another example of nozzle setting value is whether to perform the printing operation during the first direction, to perform the printing operation during the second direction, or to perform the printing operation during both the first and second direction, (i.e., bidirectional printing). Another example of nozzle setting value is the speed of the array of nozzles, for example the speed of the array of nozzles while moving through the first direction, and the speed of the array of nozzles while moving through the second direction. The speed may vary throughout the width of the printing section.

The controller 120 is further to receive a sensor signal from each color patch from a color sensor 130. In the present disclosure, a color sensor (e.g., sensor 130) may be understood as any device that scans a color patch and sends a signal that contains a measurement of the saturation and/or color density of said patch to the controller 120. One example of color sensor 130 may be a densitometer that measures the degree of darkness or optical density.

The controller 120 is to derive color saturation and/or density measurement information from the sensor 130 signals. There are a plurality of ways in which the controller 120 derives color saturation and/or density measurement information. In one example, the controller 120 may select the highest and lowest color saturations and/or density measurements and identify the corresponding color patches, and therefore, the nozzle setting values of the corresponding color patches. In another example, the controller 120 may select the three highest and three lowest color saturations and/or density measurements and identify the corresponding color patches, and therefore, the nozzle setting values of the corresponding color patches. In another example, the controller 120 may generate a color degree report from the plurality of color patches, wherein the color degree report maps each color patch with a corresponding color saturation and/or density measurement of each color patch.

The controller 120 is to select a print mode configuration based on the color saturation and/or density measurement information. A print mode configuration may be understood as the selection of the values of the features that have an effect in a printing operation. Once the print mode is configured, the apparatus 100 (e.g., a printer) may start the printing operation by printing a first slice or section of the print job.

In an example, the controller 120 may select the print mode configuration based on configuration parameters. An example of configuration parameter is to print the section of a printing job in the first direction of the array of nozzles. Another example of configuration parameter is to print the section of a printing job in the second direction of the array of nozzles. Another example of configuration parameter is to print the section of the printing job in the first array of nozzles direction and in the second array of nozzles direction. Another example of configuration parameter is the speed of the array of nozzles during the first direction. Another example of configuration parameter is the speed of the array of nozzles during the second direction, Another example of configuration parameter is the ejection mask to eject ink in a pixel. The nozzle ejection mask may be the means to eject ink in a certain pixel, for example based on an ink coverage matrix. An ink coverage matrix is a matrix that maps which pixels are to be ejected with ink and which pixels are not, then the controller 120 may eject ink thereafter.

In another example, the controller 120 may select the print mode configuration based on the color degree report by checking which nozzle setting values lead to the highest color saturation and/or density measurements or the lowest color saturation and/or density measurements.

In another example, the controller 120 may select the print mode configuration by selecting a subset of nozzles from the array of nozzles based on the color saturation and/or density measurement information. The controller 120 may select the print mode configuration wherein the selected subset of nozzles are to print the section of the print job. A plurality of examples of selecting a subset of nozzles from the array of nozzles are disclosed in further detail in FIGS. 2B-2D.

In an implementation, the apparatus 100 may be installed in a print head of a two-dimensional printer. In another implementation, the apparatus 100 may be installed in a print head of an additive manufacturing system to fabricate three dimensional objects, for example, a three-dimensional printer. There may be many other implementations where the apparatus 100 may be installed.

Figure 2A:
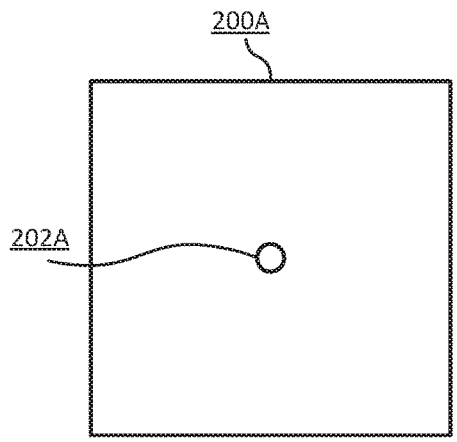
FIG. 2A is a block diagram illustrating an example of an array of nozzles.

FIG. 2A-2D illustrate examples of an array of nozzles. FIG. 2A is a block diagram illustrating an example of an array of nozzles 200A according to an implementation. The array of nozzles 200A may be the same or similar as the array of nozzles 110 from FIG. 1. The array of nozzles 200A comprises a single nozzle 202A to eject ink.

Figure 2B:
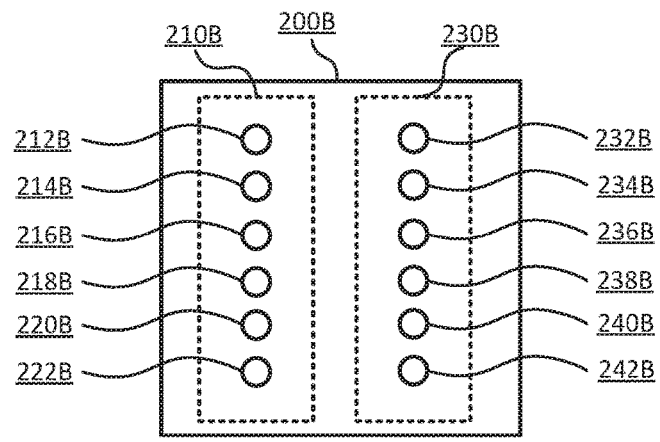
FIG. 2B is a block diagram illustrating another example of an array of nozzles.

FIG. 2B is a block diagram illustrating another example of an array of nozzles 200B according to an implementation. The array of nozzles 200B may be the same or similar as the array of nozzles 110 from FIG. 1. The array of nozzles 200B comprises a plurality of nozzles 202B-222B and 232B-242B to eject ink. The plurality of nozzles from the array of nozzles 200B may be arranged in groups or subsets. For example, the plurality of nozzles from the array of nozzles 200B are arranged in two columns, therefore defining a first subset of nozzles 210B in a first column of nozzles comprising the nozzles 212B-222B; and a second subset of nozzles 230B in a second column of nozzles comprising nozzles 232B-242B. The example disclosed herein may be taken as an example of many possible implementations, since many other subset configurations may be defined. A subset of nozzles may be selected based on the color saturation and/or density measurement information (e.g., color saturation and/or density measurement information disclosed in FIG. 1). A print mode configuration (e.g., print mode configuration disclosed in FIG. 1) may be applied to a subset of nozzles (e.g., first subset of nozzles 210B) and, therefore may not be applied to the entire plurality of nozzles 212B-222B and 232B-242B of the array of nozzles 200B. For completeness, a controlling entity (e.g., controller 120 from FIG. 1) may select different print mode configurations to different subset of nozzles from the array of nozzles 200B; for example, a first print mode configuration may be selected to the first subset of nozzles 210B from the array of nozzles 200B, and a second print mode configuration may be selected to the second subset of nozzles 230B from the array of nozzles 200B.

Figure 2C:
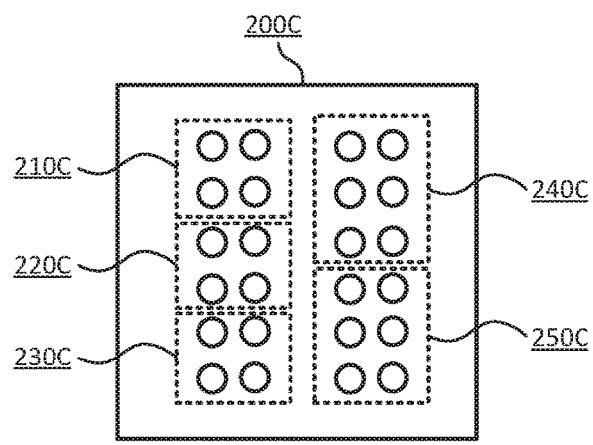
FIG. 2C is a block diagram illustrating another example of an array of nozzles.

FIG. 2C is a block diagram illustrating another example of an array of nozzles according to an implementation. The array of nozzles 200C may be the same or similar as the array of nozzles 110 from FIG. 1. The array of nozzles 200C comprises a plurality of nozzles to eject ink. The plurality of nozzles from the array of nozzles 200C may be arranged in groups or subsets with the same or different amount of nozzles therein. For example, the plurality of nozzles from the array of nozzles 200C may be arranged in five subsets of nozzles: a first subset of nozzles 210C comprising four nozzles, a second subset of nozzles 220C comprising four nozzles, a third subset of nozzles 230C comprising four nozzles, a fourth subset of nozzles 240C comprising six nozzles, and a fifth subset of nozzles 250C comprising six nozzles. The plurality of nozzles from the array of nozzles 200C may be arranged in physical groups. The physical groups may be defined by one or more nozzles sharing a similar physical attribute with the nozzles being comprised in the same group (e.g., nozzles arranged in columns). For example, the plurality of nozzles from the array of nozzles 200C may be arranged in two physical groups defining a first column and a second column. The plurality of subsets of nozzles and the physical groups may not correspond. The example disclosed herein may be taken as an example of many possible implementations, since many other subset configurations and physical groups may be defined. A subset of nozzles may be selected based on the color saturation and/or density measurement information (e.g., color saturation and/or density measurement information disclosed in FIG. 1). A print mode configuration (e.g., print mode configuration disclosed in FIG. 1) may be applied to a subset of nozzles (e.g., first subset of nozzles 210C) and, therefore may not be applied to the entire plurality of nozzles of the array of nozzles 200C. For completeness, a controlling entity (e.g., controller 120 from FIG. 1) may select different print mode configurations to different subset of nozzles from the array of nozzles 200C; for example, a first print mode configuration may be selected to the first subset of nozzles 210C from the array of nozzles 200C, a second print mode configuration may be selected to the second subset of nozzles 220C from the array of nozzles 200C, a third print mode configuration may be selected to the third subset of nozzles 230C from the array of nozzles 200C, a fourth print mode configuration may be selected to the fourth subset of nozzles 240C from the array of nozzles 200C, and a fifth print mode configuration may be selected to the fifth subset of nozzles 250C from the array of nozzles 200C.

Figure 2D:
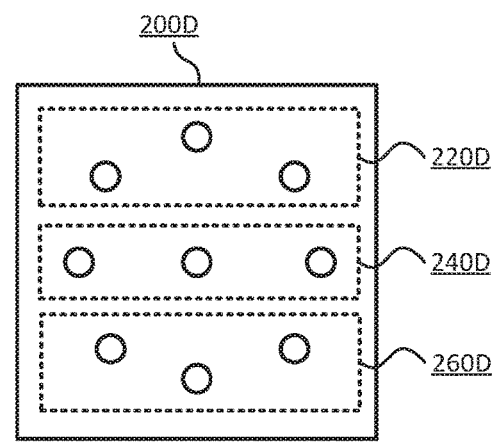
FIG. 2D is a block diagram illustrating another example of an array of nozzles.

FIG. 2D is a block diagram illustrating another example of an array of nozzles according to an implementation. The array of nozzles 200D may be the same or similar as the array of nozzles 110 from FIG. 1. The array of nozzles 200D comprises a plurality of nozzles to eject ink. The plurality of nozzles of the array of nozzles 200D may define different geometrical shapes, for example the plurality of nozzles of the array of nozzles 200D define a circle comprising an outer circle of nozzles and an inner circle of nozzles (central nozzle). The plurality of nozzles from the array of nozzles 200D may be arranged in groups or subsets with the same or different amount of nozzles therein. For example, the plurality of nozzles from the array of nozzles 200D may be arranged in three subsets of nozzles: a first subset of nozzles 220D comprising three nozzles, a second subset of nozzles 240D comprising three nozzles, and a third subset of nozzles 2600 comprising three nozzles. As another example, the plurality of nozzles may be arranged in two subsets of nozzles, a first subset of nozzles comprising the nozzles that define the outer circle, and a second subset of nozzles comprising the nozzles that define the inner circle (central nozzle). The example disclosed herein may be taken as an example of many possible implementations, since many other subset configurations and physical groups may be defined. A subset of nozzles may be selected based on the color saturation and/or density measurement information (e.g., color saturation and/or density measurement information disclosed in FIG. 1). A print mode configuration (e.g., print mode configuration disclosed in FIG. 1) may be applied to a subset of nozzles (e.g., first subset of nozzles 220D) and, therefore may not be applied to the entire plurality of nozzles of the array of nozzles 200D, For completeness, a controlling entity (e.g., controller 120 from FIG. 1) may select different print mode configurations to different subset of nozzles from the array of nozzles 200D; for example, a first print mode configuration may be selected to the first subset of nozzles 220D from the array of nozzles 200D; a second print mode configuration may be selected to the second subset of nozzles 240D from the array of nozzles 200D; and a third print mode configuration may be selected to the third subset of nozzles 260D from the array of nozzles 200D.

Figure 3:
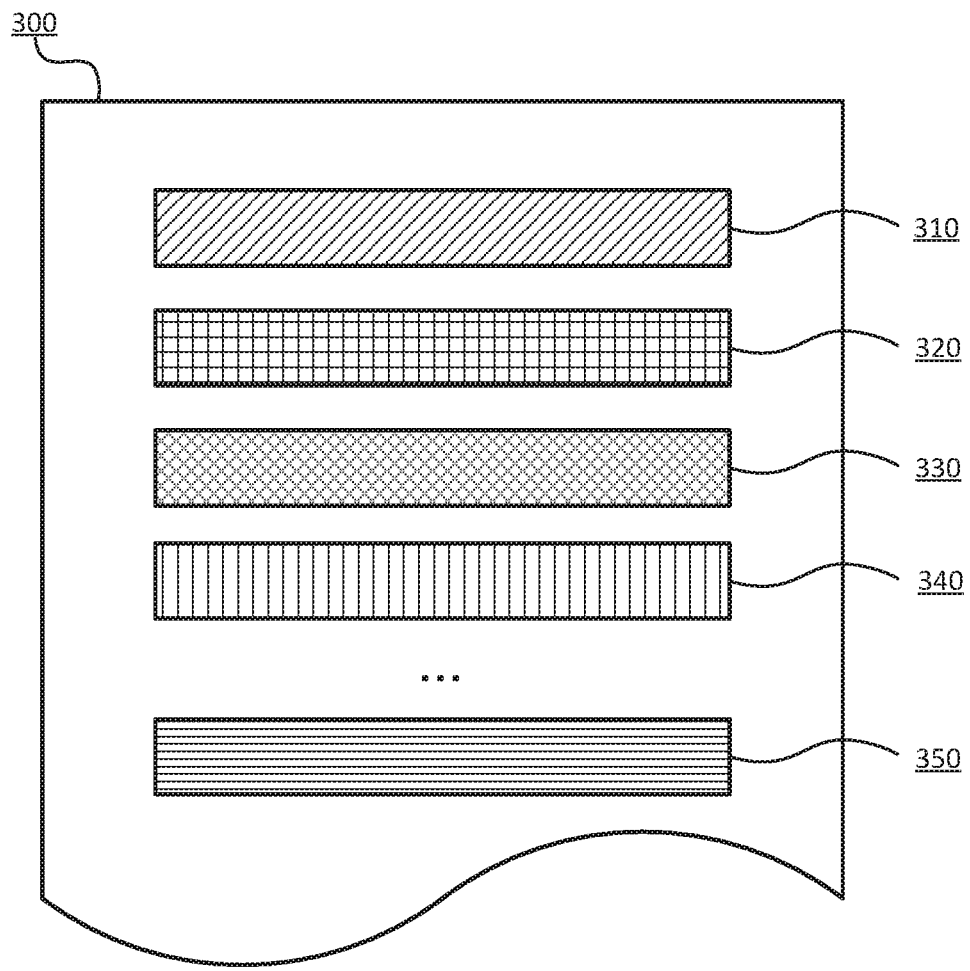
FIG. 3 is a block diagram illustrating an example of color patches.

FIG. 3 is a block diagram illustrating an example of color patches 310-350 according to an implementation. The plurality of color patches 310-350 are printed in a predetermined substrate (e.g., paper, fabric, plastic, 3D printing build material, any other suitable printing material, or the like), therefore defining the printed substrate 300 as the substrate with the color patches 310-350 printed thereon. Each color patch may be printed by a printing entity (e.g., apparatus 100 from FIG. 1) that may be instructed to perform said operation by, for example, a controlling entity (e.g., controller 120 from FIG. 1). The printed substrate 300 may comprise a plurality of ink patches. In the example illustrated in FIG. 3, the printed substrate comprises a first color patch 310, a second color patch 320, a third color patch 330, a fourth color patch 340, up to a Nth color patch 350. Each color patch may have been printed using different nozzle setting values; for example, the color, whether to print in the first, the second, or both directions, the first direction speed, the second direction speed, and the like. The example disclosed herein it is an example, and further similar and different implementations can be derived therefrom.

Table 1 shows another example of an implementation of the printing operation of the plurality of color patches 310-350 on a printed substrate 300. A controlling entity from a printing entity (e.g., controller 120 from apparatus 100) may define a plurality of color patches to be printed using different nozzle setting values, Table 1 shows that the controlling entity defines a plurality of color patches to be printed on the substrate 300. In the example, the controlling entity defined a first color patch as a color patch to be printed in Magenta color, in the first direction, and in a first direction speed of 30 ips (inch per second); the second color patch as a color patch to be printed in Magenta color, in the second direction, and in a second direction speed of 60 ips; the third color patch as a color patch to be printed in Magenta color, in the first and second direction, in a first direction speed of 30 ips, and a second direction speed of 40 ips; the fourth color patch as a color patch to be printed in Magenta color, in the first and second direction, in a first direction speed of 60 ips, and a second direction speed of 60 ips; up to the Nth color patch as a color patch to be printed in Magenta color, in the first direction, and in a first direction speed of 60 ips, Table 1 is an example, and therefore more or less patches may be defined with more, less, and/or different nozzle setting values. Table 1 configuration may be printed by a printing entity (e.g., apparatus 100 of FIG. 1) in the printed substrate 300. For example, the first color patch of Table 1 may correspond to the color patch 310; the second color patch of Table 1 may correspond to the color patch 320; the third color patch of Table 1 may correspond to the color patch 330; the fourth color patch of Table 1 may correspond to the color patch 340; up to the Nth color patch of Table 1 that may correspond to the color patch 350.

TABLE 1

Example of color patch configuration by nozzle setting values

|  | Color | Directions | First Speed | Second Speed |
|---|---|---|---|---|
| Patch 1 | Magenta | First | 30 | — |
| Patch 2 | Magenta | Second | — | 60 |
| Patch 3 | Magenta | First and Second | 30 | 40 |
| Patch 4 | Magenta | First and Second | 60 | 60 |
| . . . | . . . | . . . | . . . | . . . |
| Patch N | Magenta | First | 60 | — |

A sensor (not shown) (e.g., sensor 130 from FIG. 1) may read the color saturation and/or density of the plurality of color patches 310-350 from the printed substrate 300. The sensor may send signals to the controller entity relating to the color saturation and/or density of the plurality of color patches 310-350. In another example, the controlling entity may generate a color degree report from the signals received from the sensor. The color degree report may be a report mapping each color patch nozzle setting values with its respective color saturation and/or density measurements. Table 2 shows an example of the color saturation of the plurality of color patches 310-350. In the example, the sensor sends to the controlling entity that color ink patch 310 has a saturation of 60%; the color ink patch 320 has a saturation of 80%; the color ink patch 330 has a saturation of 90%; the color ink patch 340 has a saturation of 100%; up to the color ink patch 350 that has a saturation of 80%.

TABLE 2

Example of color patch saturation measurements sent by a sensor to the controller

|  | Color Saturation |
|---|---|
| Patch 1 | 60% |
| Patch 2 | 80% |
| Patch 3 | 90% |
| Patch 4 | 100% |
| . . . | . . . |
| Patch N | 80% |

The controlling unit may select a print mode configuration based on the color saturation and/or density measurement information. For example, the controlling unit may select the print mode configuration of the highest and lowest color saturation and/or density measurements. In said example; and relating to Table 2, the controlling unit may select the nozzle setting values of color patch 340 as the printing mode configuration because it comprises the highest saturation and/or density measurement value within the printed substrate 300; or the nozzle setting values of color patch 310 as the printing mode configuration because it comprises the lowest saturation and/or density measurement value within the printed substrate 300. This is an example, therefore other possible selection criteria may be derived therefrom.

Figure 4:
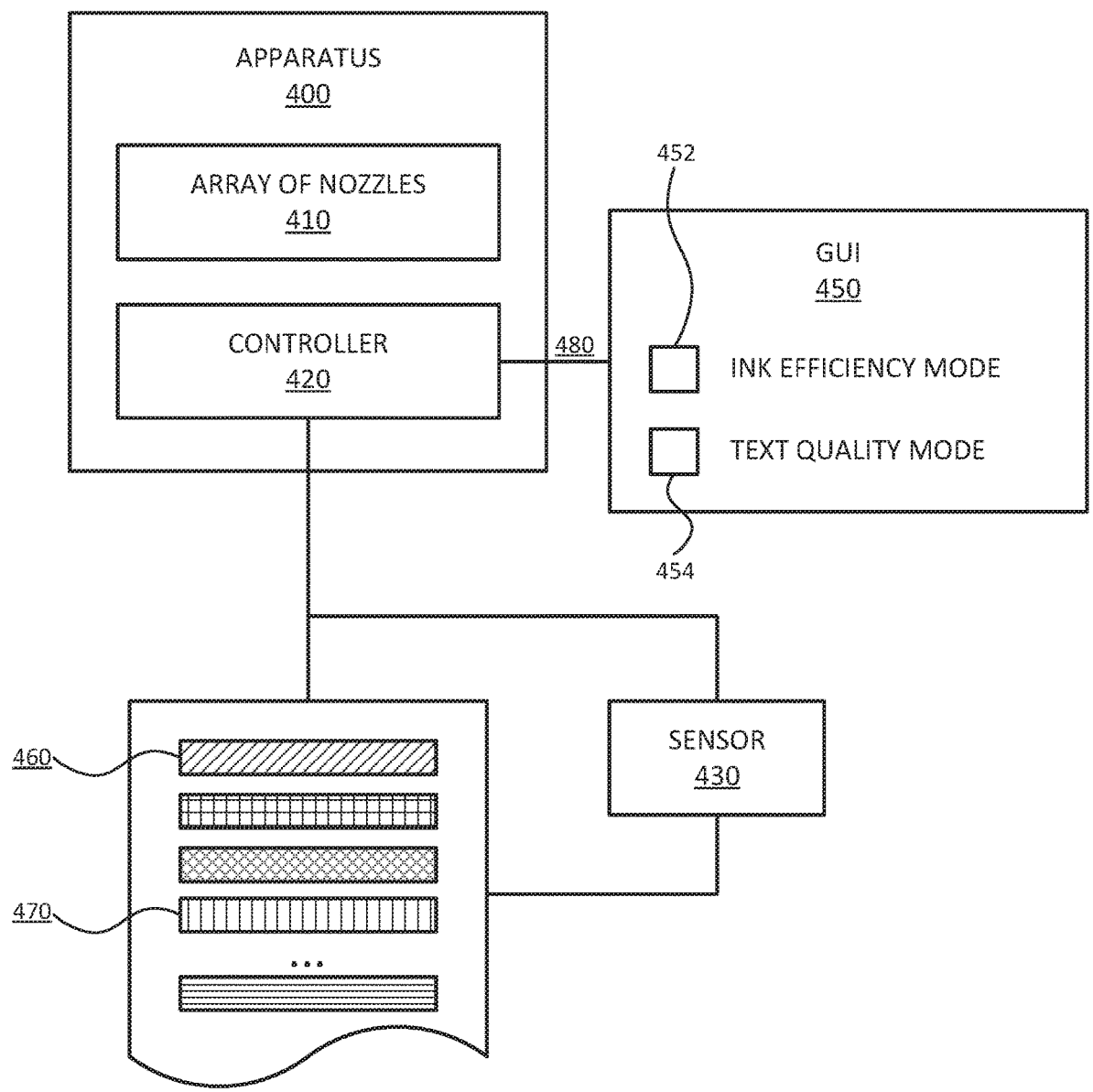
FIG. 4 is a block diagram illustrating an example of an apparatus with a user predetermined configuration interface.

FIG. 4 is a block diagram illustrating an example of an apparatus 400 with a user predetermined configuration interface according to an implementation. The apparatus 400 may be the same or similar as the apparatus 100 from FIG. 1. The apparatus 400 may include an array of nozzles 410, and a controller 420. The term "controller" as used herein may include a series of instructions encoded on a machine-readable storage medium and executable by a single processor or a plurality of processors. Additionally or alternatively, a controller may include one or more hardware devices including electronic circuitry, for example a digital and/or analog application-specific integrated circuit (ASIC), for implementing the functionality described herein.

In some implementations, the array of nozzles 410 may be mounted in the printing plate of a print head. The array of nozzles 410 may be coupled to an external ink repository to provide ink; whereas in different implementations, the ink repository may be included in the array of nozzles 410. The array of nozzles 410 is bidirectional coupled to the controller 420. The controller 420 is to instruct the array of nozzles 410 to print a plurality of color patches (e.g., color patches 310-350 in substrate 300 from FIG. 3). Each color patch being printed using different nozzle setting values.

The controller 420 is further to receive a sensor signal from each color patch from a color sensor 430. The color sensor 430 may be the same or similar to the color sensor 130 from FIG. 1. The controller 420 is to derive color saturation and/or density measurement information from the sensor 430 signals. As disclosed above in detail, there are a plurality of ways in which the controller 420 derives color saturation and/or density measurement information. For simplicity, in this example, the controller 420 may select the highest and lowest color saturations and/or density measurements and identify the corresponding color patches. The controller 420 selected color patch 460 as the color patch with the highest color saturation and/or density measurement; and the color patch 470 as the color patch with the lowest color saturation and/or density measurement.

The controller 420 may select a print mode configuration based on the color saturation and/or density measurement information and a user predetermined configuration. The user predetermined configuration may be inputted to the apparatus 100 via a Graphic User Interface 450 (GUI) in which the user may manually select a printing mode. For example, the user may select through the GUI 450 either an ink efficiency mode 452 (i.e., first printing mode) or a text quality mode 454 (i.e., second printing mode). The ink efficiency mode is a printing mode that given a certain amount of ink, selects the optimal printing mode on basis of emphasizing the dot gain to maximize saturation. The text quality mode is a printing mode that given a certain amount of ink, select the optimal printing mode on basis of emphasizing the dot shape to maximize reproduction of fine detail and sharp texts and lines. The controller 420 may receive the user predetermined configuration through a bus 480 connecting the GUI 450 and the controller 420. In the event that the user predetermined configuration is set as ink efficiency mode, the controller 420 may select the print mode configuration corresponding to the color patch with the highest color saturation and/or density measurement from the color saturation and/or density measurement information, in the example, the controller 420 may select the color patch 460. On the contrary, in the event that the user predetermined configuration is set as text quality mode, the controller 420 may select the print mode configuration corresponding to the color patch with the lowest color saturation and/or density measurement from the color saturation and/or density measurement information, in the example, the controller 420 may select the color patch 470.

Figure 5:
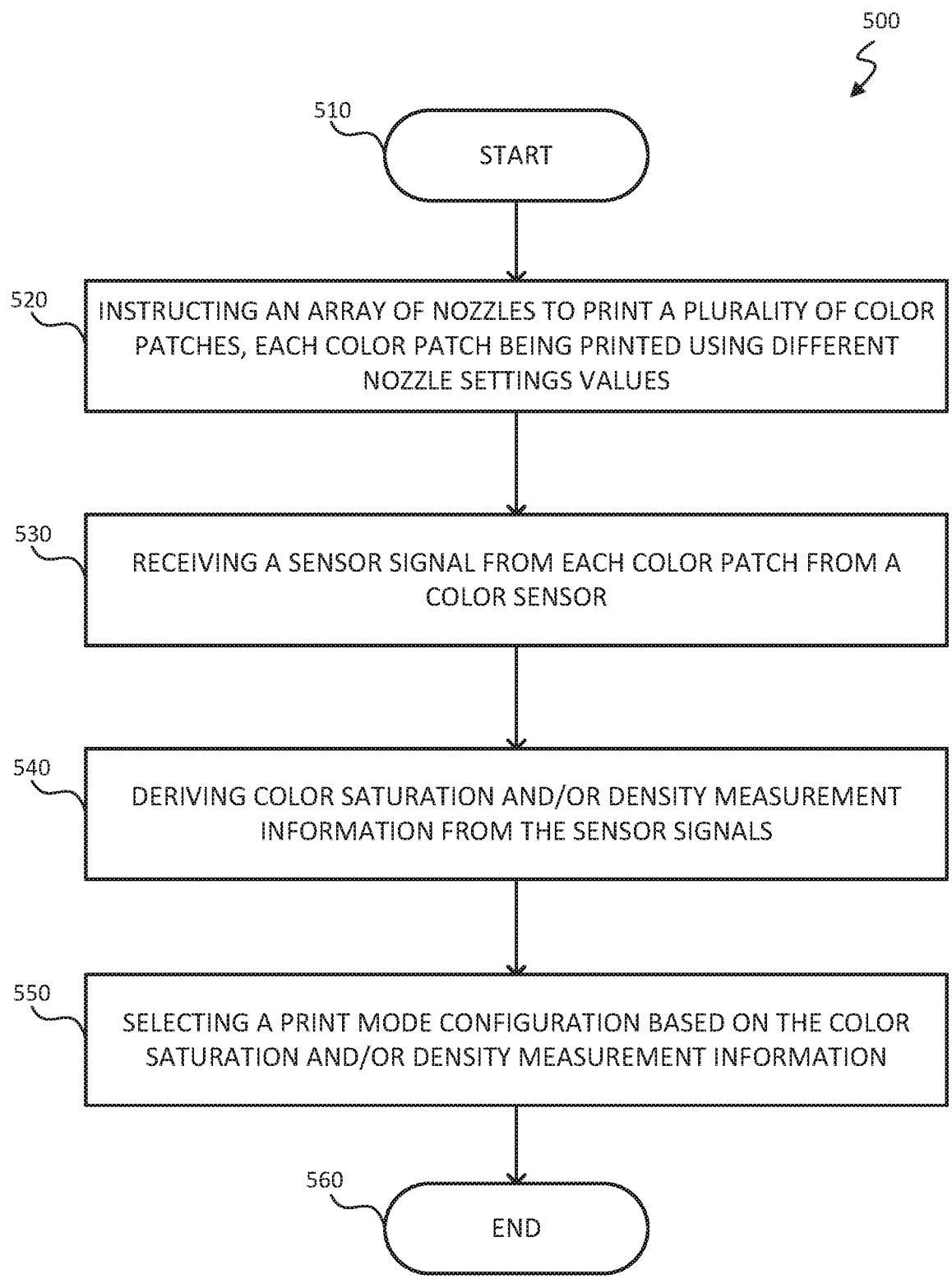
FIG. 5 is a flowchart of an example method for selecting print mode configurations.

FIG. 5 is a flowchart of an example method 500 for selecting print mode configurations according to an implementation. Method 500 may be described below as being executed or performed by an apparatus, such as apparatus 100 of FIG. 1. Various other suitable systems may be used as well, such as, for example apparatus 400 of FIG. 4. Method 500 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 500 may include more or less blocks than are shown in FIG. 5. In some implementations, one or more of the blocks of method 500 may, at certain times, be ongoing and/or may repeat.

Figure 6:
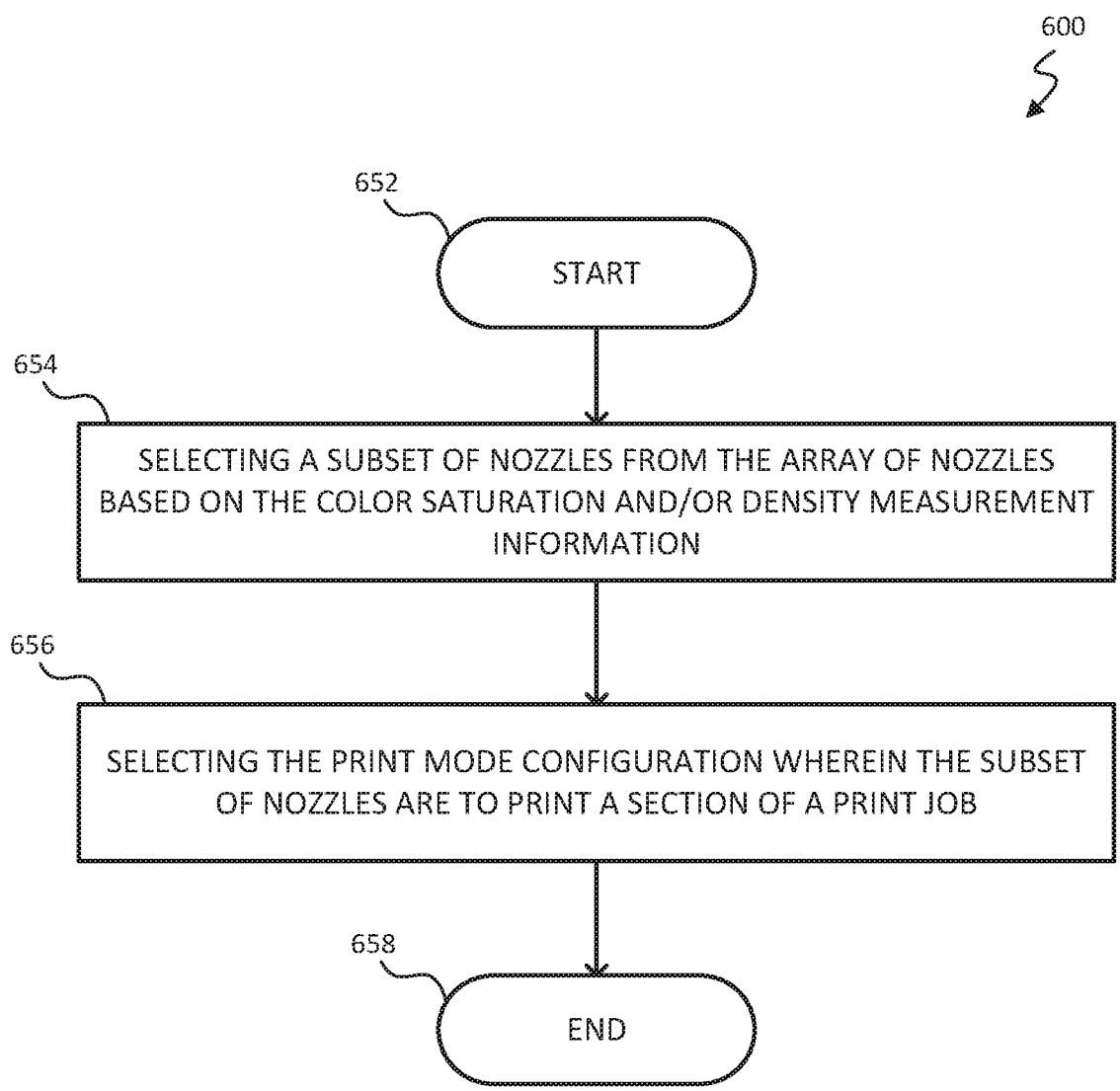
FIG. 6 is a flowchart of another example method for selecting print mode configurations.

The method 500 may start at block 510, and continue to block 520, where a controller (e.g., controller 120 from FIG. 1) may instruct an array of nozzles (e.g., array of nozzles 110 from FIG. 1) to print a plurality of color patches (e.g., plurality of color patches 310-350 from FIG. 3), each color patch being printed using different nozzle settings values. At block 530, the controller receives a sensor signal from each color patch from a color sensor (e.g., sensor 130 from FIG. 1). At block 540, the controller may derive a color saturation and/or density measurement information from the sensor signals. At block 550, the controller may select a print mode configuration based on the color saturation and/or density measurement information, At block 560, the method 500 may end, FIG. 6 is a flowchart of another example method 600 for selecting print mode configurations. Method 600 may be a sub-method of block 550 from method 500 of FIG. 5. Method 600 may be described below as being executed or performed by an apparatus, such as apparatus 100 of FIG. 1. Various other suitable systems may be used as well, such as, for example apparatus 400 of FIG. 4. Method 500 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 600 may include more or less blocks than are shown in FIG. 6. In some implementations, one or more of the blocks of method 600 may, at certain times, be ongoing and/or may repeat.

The method 600 may start at block 652, and continue to block 654, where a controller (e.g., controller 120 from FIG. 1) may select a subset of nozzles (e.g., subset of nozzles 210B from FIG. 2B) from the array of nozzles (e.g., array of nozzles 200B from FIG. 2B) based on the color saturation and/or density measurement information. At block 656, the controller may select the print mode configuration wherein the subset on nozzles are to print a section of a print job. At block 658, the method 600 may end.

Figure 7:
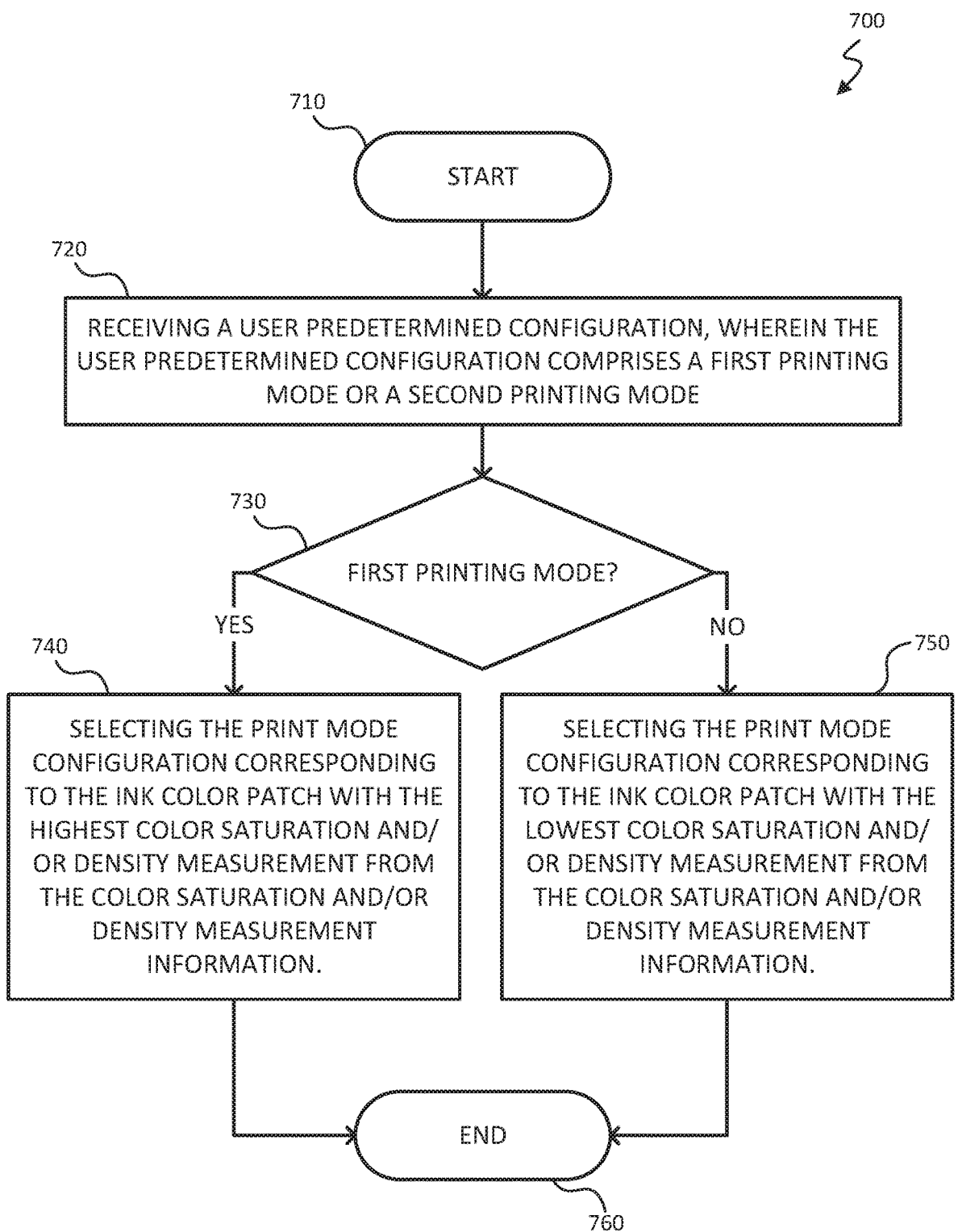
FIG. 7 is a flowchart of another example method for selecting print mode configurations.

FIG. 7 is a flowchart of another example method 700 for selecting print mode configurations. Method 700 may be described below as being executed or performed by an apparatus, such as apparatus 100 of FIG. 1. Various other suitable systems may be used as well, such as, for example apparatus 400 of FIG. 4. Method 700 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 700 may include more or less blocks than are shown in FIG. 7. In some implementations, one or more of the blocks of method 700 may, at certain times, be ongoing and/or may repeat.

The method 700 may start at block 710, and continue to block 720, where a controller (e.g., controller 120 from FIG. 1) may receive a user predetermined configuration, wherein the user predetermined configuration comprises a first printing mode (e.g., ink efficiency mode 452 from FIG. 4) or a second printing mode (e.g., text quality mode 454 from FIG. 4). At decision block 730, the controller determines whether the user predetermined configuration is either an first printing mode or a second printing mode. If the controller determines that the user predetermined configuration is a first printing mode, the method 700 continues to block 740, where the controller may select the print mode configuration corresponding to the color patch (e.g., color patch 460 from FIG. 4) with the highest color saturation and/or density measurement from the color saturation and/or density measurement information, then method 700 continues to block 760. If the controller determines that the user predetermined configuration is a second printing mode, the method 700 continues to block 750, where the controller may select the print mode configuration corresponding to the color patch (e.g., color patch 470 from FIG. 4) with the lowest color saturation and/or density measurement from the color saturation and/or measurement information, then method 700 continues to block 760. At block 760, the method 700 may end.

Figure 8:
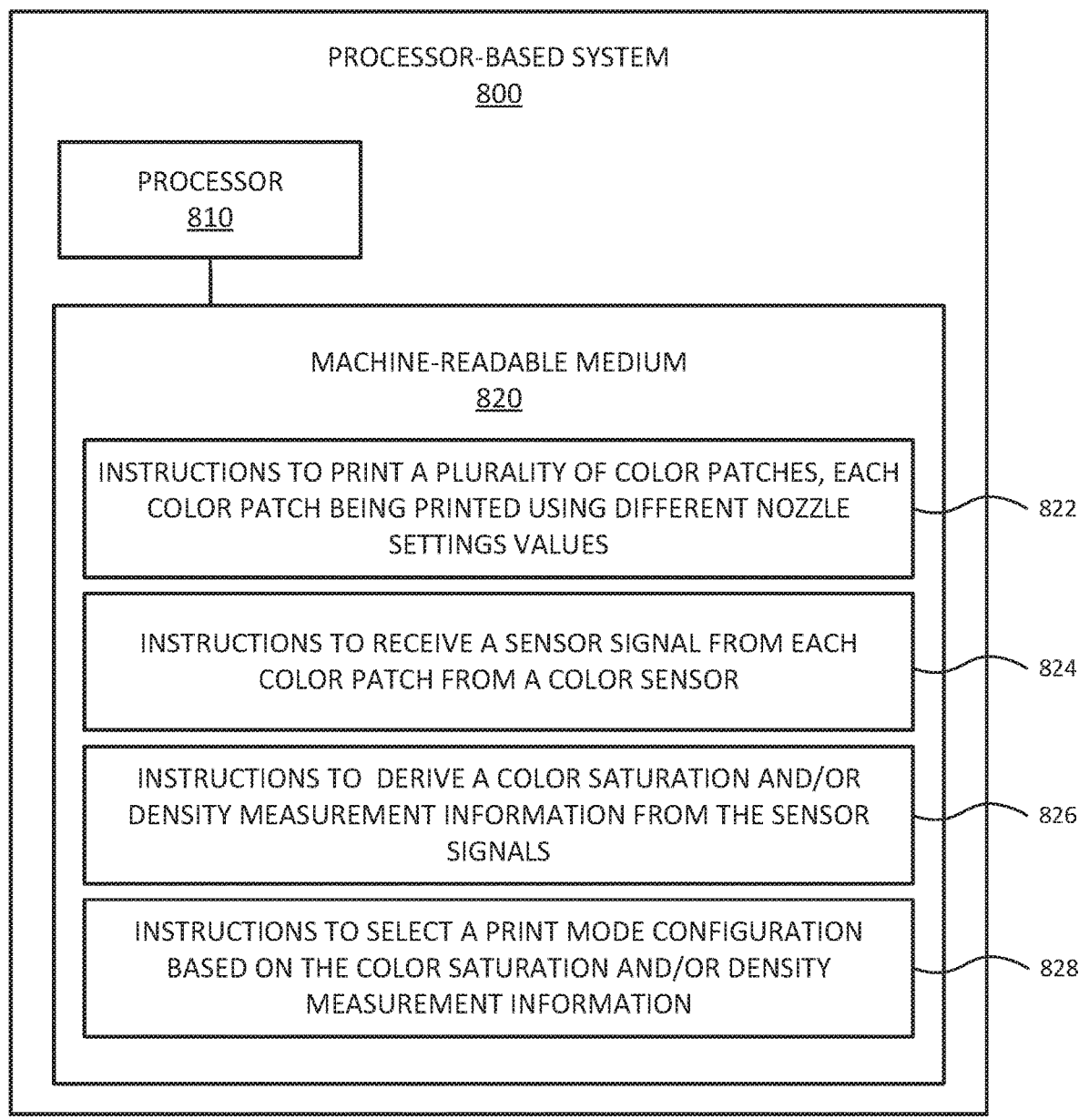
FIG. 8 is a block diagram illustrating an example of a processor-based system to select print mode configurations.

FIG. 8 is a block diagram illustrating a processor-based system 800 that includes a machine-readable medium encoded with example instructions to select a print mode configuration. In some implementations, the system 800 may be or may form part of a printing device, such as a printer. In some implementations, the system 800 is a processor-based system and may include a processor 810 coupled to a machine-readable medium 820. The processor 810 may include a single-core processor, a multi-core processor, an application-specific integrated circuit (ASIC), a field programmable gate array (FPGA), and/or any other hardware device suitable for retrieval and/or execution of instructions from the machine-readable medium 820 (e.g., instructions 822, 824, 826, and 828) to perform functions related to various examples. Additionally or alternatively, the processor 810 may include electronic circuitry for performing the functionality described herein, including the functionality of instructions 822, 824, 826, and/or 828. With respect of the executable instructions represented as boxes in FIG. 8, it should be understood that part or all of the executable instructions and/or electronic circuits included within one box may, in alternative implementations, be included in a different box shown in the figures or in a different box not shown.

The machine-readable medium 820 may be any medium suitable for storing executable instructions, such as a random access memory (RAM), electrically erasable programmable read-only memory (EEPROM), flash memory, hard disk drives, optical disks, and the like. In some example implementations, the machine-readable medium 820 may be a tangible, non-transitory medium, where the term "non-transitory" does not encompass transitory propagating signals. The machine-readable medium 820 may be disposed within the processor-based system 800, as shown in FIG. 8, in which case the executable instructions may be deemed "installed" on the system 800. Alternatively, the machine-readable medium 820 may be a portable (e.g., external) storage medium, for example, that allows system 800 to remotely execute the instructions or download the instructions from the storage medium. In this case, the executable instructions may be part of an "installation package". As described further herein below, the machine-readable medium may be encoded with a set of executable instructions 822-828.

Instructions 822, when executed by the processor 810, may print a plurality of color patches (e.g., color patches 310-350 from FIG. 3), each color patch being printed using different nozzle settings values. Instructions 824, when executed by the processor 810, may cause the processor 810 to receive a sensor signal (e.g., from sensor 130 from FIG. 1) from each color patch from a color sensor. Instructions 826, when executed by the processor 810, may cause the processor 810 to derive color saturation and/or density measurement information from the received signals. Instructions 828, when executed by the processor 810, may cause the processor 810 to select a print mode configuration based on the color saturation and/or density measurement information.

The machine-readable medium 820 may include further instructions. For example, instructions that when executed by the processor 810, may cause the processor 810 to select a subset of nozzles from the array of nozzles based on the color saturation and/or density measurement information; and/or instructions that when executed by the processor 810, may cause the processor 810 to select the print mode configuration wherein the subset of nozzles are to print a section of a print job.

The machine-readable medium 820 may include further instructions. For example, instructions that when executed by the processor 810, may cause the processor 810 to receive a user predetermined configuration that comprises a first printing mode (e.g., ink efficiency mode 452 of FIG. 4) or a second printing mode (e.g., text quality mode 454 of FIG. 4).

If the user configuration comprises a first printing mode, the machine-readable medium 820 may further comprise instructions that when executed by the processor 810, may cause the processor 810 to select the print mode configuration corresponding to the color patch with the highest color saturation and/or density measurement from the color saturation and/or density measurement information. If the user configuration comprises a second printing mode, the machine-readable medium 820 may further comprise instructions that when executed by the processor 810, may cause the processor 810 to select the print mode configuration corresponding to the color patch with the lowest color saturation and/or density measurement from the color saturation and/or density measurement information.

The above examples may be implemented by hardware, or software in combination with hardware. For example the various methods, processes and functional modules described herein may be implemented by a physical processor (the term processor is to be implemented broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What it is claimed is:

1. An apparatus comprising:
    an array of nozzles to eject ink; and
    a controller to:
        instruct the array of nozzles to print a plurality of color patches, each color patch being printed using different nozzle settings values,
        receive a sensor signal from each color patch from a color sensor,
        derive a color saturation and/or density measurement information from the sensor signals, and
        select a print mode configuration based on the color saturation and/or density measurement information;
        wherein the controller is to rank the different nozzle settings values for the array of nozzles by color saturation and/or density measurement based on the color saturation and/or density measurement information.

2. The apparatus of claim 1 wherein the controller is further to:
    generate a color degree report from the plurality of color patches, wherein the color degree report maps each color patch with a corresponding color saturation and/or density measurement of each color patch; and
    select the print mode configuration based on the color degree report.

3. The apparatus of claim 1, wherein the different nozzle settings values comprises the color, and at least one of a first array of nozzles direction, a second array of nozzles direction, a first array of nozzles speed, and a second array of nozzles speed.

4. The apparatus of claim 3, wherein the first array of nozzles speed relates to the first array of nozzles direction and the second array of nozzles speed relates to the second array of nozzles direction, the second array of nozzles direction being opposed to the first array of nozzles direction.

5. The apparatus of claim 1, wherein the controller is further to:
select a subset of nozzles from the array of nozzles based on the color saturation and/or density measurement information; and
select the print mode configuration wherein the subset of nozzles are to print a section of a print job.

6. The apparatus of claim 1, wherein the controller is to select the print mode configuration based on configuration parameters that comprises at least one of:
print a section of a printing job in a first direction;
print the section of the printing job in a second direction;
print the section of the printing job in the first direction and in the second direction;
the printing speed of the first direction;
the printing speed of the second direction;
a nozzle ink ejection mask to eject ink in a pixel.

7. The apparatus of claim 6 wherein the nozzle ink ejection mask is to eject ink in a pixel based on an ink coverage matrix, wherein the ink coverage matrix maps which pixels are to be ejected with ink.

8. The apparatus of claim 1, wherein a user inputs a user predetermined configuration, the user predetermined configuration comprising: a first printing mode; or a second printing mode, the controller is to:
select the print mode configuration corresponding to the color patch with the highest color saturation and/or density measurement from the color saturation and/or density measurement information, wherein the user predetermined configuration is set as the first printing mode; and
select the print mode configuration corresponding to the color patch with the lowest color saturation and/or density measurement from the color saturation and/or density measurement information wherein the user predetermined configuration is set as the second printing mode.

9. The apparatus of claim 1 wherein the printer is a two-dimensional or a three-dimensional printer.

10. The apparatus of claim 1 wherein the color sensor color is a color sensor within the apparatus.

11. The apparatus of claim 1, wherein the controller is to select the print mode configuration based on the color saturation.

12. The apparatus of claim 11, wherein the controller is to:
select a first print mode configuration for a highest color saturation; and
select a second print mode configuration for a lowest color saturation.

13. The apparatus of claim 1, wherein the controller is to select different print mode configurations for different subsets of nozzles from the array of nozzles based on the color saturation and/or density measurement information.

14. The apparatus of claim 1, wherein the controller is to:
determine a color patch with a highest color saturation and/or density measurement information from the plurality of color patches; and
select the nozzle setting values for the color patch with a highest color saturation as the print mode configuration.

15. The apparatus of claim 1, wherein the plurality of color patches are printed with an ink of a single color.

16. A method comprising:
instructing an array of nozzles to print a plurality of color patches, each color patch being printed using different nozzle settings values;
receiving a sensor signal from each color patch from a color sensor;
deriving a color saturation and/or density measurement information from the sensor signals,
selecting a print mode configuration based on the color saturation and/or density measurement information; and
ranking the different nozzle settings values for the array of nozzles by color saturation and/or density measurement based on the color saturation and/or density measurement information.

17. The method of claim 16, wherein the selecting a print mode configuration comprising:
selecting a subset of nozzles from the array of nozzles based on the color saturation and/or density measurement information; and
selecting the print mode configuration wherein the subset of nozzles are to print a section of a print job.

18. The method of claim 16, comprising:
receiving a user predetermined configuration, wherein the user predetermined configuration comprises a first printing mode or a second printing mode;
selecting the print mode configuration corresponding to the color patch with the highest color saturation and/or density measurement from the color saturation and/or density measurement information, wherein the user predetermined configuration is set as the first printing mode; and
selecting the print mode configuration corresponding to the color patch with the lowest color saturation and/or density measurement from the color saturation and/or density measurement information, wherein the user predetermined configuration is set as the second printing mode.

19. A non-transitory machine readable medium storing instructions executable by a processor, the non-transitory machine readable medium comprising:
instructions to print a plurality of color patches, each color patch being printed using different nozzle settings values;
instructions to receive a sensor signal from each color patch from a color sensor;
instructions to derive a color saturation and/or density measurement information from the sensor signals;
instructions to select a print mode configuration based on the color saturation and/or density measurement information; and
instructions to rank the different nozzle settings values by color saturation and/or density measurement based on the color saturation and/or density measurement information.

* * * * *